United States Patent [19]

Rump et al.

[11] Patent Number: 5,445,444
[45] Date of Patent: Aug. 29, 1995

[54] AUTOMATIC BRAKING PROCEDURE FOR MOTOR VEHICLES WITH AN ABS

[75] Inventors: Siegfried Rump, Weinstadt; Manfred Steiner, Winnenden, both of Germany

[73] Assignee: Mercedes-Benz AG, Germany

[21] Appl. No.: 225,068

[22] Filed: Apr. 8, 1994

[30] Foreign Application Priority Data

Nov. 8, 1993 [DE] Germany .................. 43 38 066.2

[51] Int. Cl.⁶ .............................................. B60T 8/64
[52] U.S. Cl. ................. 303/125; 303/113.2; 303/113.4; 303/186; 364/426.02
[58] Field of Search ........... 303/100, 110, 111, 113.2, 303/113.3, 115.4, 116.1, 113.4; 364/426.01, 426.02, 426.03

[56] References Cited

U.S. PATENT DOCUMENTS 5,158,343 10/1992 Reichelt et al. ............... 188/353 X
5,261,730 11/1993 Steiner et al. ................ 303/115.4 X

FOREIGN PATENT DOCUMENTS 4028290 1/1992 Germany .

Primary Examiner—Robert J. Oberleitner
Assistant Examiner—Lee W. Young
Attorney, Agent, or Firm—Evenson, McKeown, Edwards & Lenahan

[57] ABSTRACT

A method and apparatus for carrying out an automatic braking procedure to further reduce the braking distance required for a braking operation. The brake pressure produced during the performance of the automatic braking procedure is increased at each axle until the ABS detects the reaching of the locking limit of at least one wheel of the respective axle. A further reduction in the braking distance is thus achieved by not only increasing the brake pressure to such an extent that one wheel of the vehicle reaches the locking limit but by increasing the brake pressure of the individual axles until at least one wheel of the respective axle reaches the locking limit. The maximum force transmission between the wheel and the roadway is thus obtained at each axle.

11 Claims, 2 Drawing Sheets

AUTOMATIC BRAKING PROCEDURE FOR MOTOR VEHICLES WITH AN ABS

BACKGROUND AND SUMMARY OF THE INVENTION

The present invention relates to an automatic braking procedure and apparatus, and more particularly, to a method and apparatus for automatic braking of a motor vehicle with an anti-lock system, an automatic braking procedure being carried out on fulfillment of a trigger criterion, a higher pressure than that which corresponds to the position of the brake pedal being produced during the automatic braking procedure, and the automatic braking procedure being ended on fulfillment of an abort criterion.

In an automatic braking procedure described in DE 40 28 290 Cl, the brake pressure produced when the driver actuates the brake pedal at a speed which exceeds a threshold is above the brake pressure which corresponds to the position of the brake pedal. This is intended to reduce the braking distance of the vehicle in the case of emergency braking operations such as those which are carried out by the driver in emergency situations, e.g. to avoid collisions. The known automatic braking procedure is aborted when the pedal return speed exceeds a certain threshold. For example, the maximum brake pressure which can be produced is limited by the anti-lock system (ABS) such that the locking up of wheels is just prevented. Further trigger and abort criteria for an automatic braking procedure are contained, for example, in German Patent Application DE-P. 43 25 940.5.

The conventional automatic braking procedure shortens the braking distance of a vehicle because a certain brake pressure to be achieved is produced at least more quickly than is the case with a corresponding actuation of the brake pedal by the driver. Furthermore, higher brake pressures are generally produced since drivers frequently do not brake sufficiently hard. The braking operation which takes place in this way utilizes the information on the adhesion coefficient provided by the ABS installed in the vehicle only insofar as the ABS prevents locking up of the wheels during the automatic braking procedure by virtue of the fact that the reaching of the locking limits at one wheel prevents a further rise in the brake pressure.

It is an object of the invention to markedly improve the known automatic braking procedure such that the braking distance of the vehicle is further reduced by the automatic braking procedure.

This object has been achieved by the fact that the brake pressure produced during the performance of the automatic braking procedure is increased at each axle to an extent such that the anti-lock system detects the reaching of the locking limits of at least one wheel of the respective axle. A reduction in the braking distance as compared with the known automatic braking procedure is accordingly achieved by the fact that the brake pressure is not only increased to such an extent that one wheel of the vehicle reaches the locking limit but to such an extent that the brake pressure of the individual axles is increased until one wheel of this axle reaches the locking limit. The maximum transmission of force between the wheel and the roadway is thus utilized at each axle. In the case of passenger vehicles, it depends above all on the configuration of the brake system of the vehicle and, in the case of lorries, above all on the cargo and on the load distribution of the cargo at which of the axles of the vehicle the locking limit is reached first.

In the present invention, the locking limit of a wheel is to be regarded as the torque at which the slip between the wheel and the road becomes so great that a further rise in brake pressure triggers regulation of the braking force at this wheel or at the axle of the wheel by the ABS. According to an embodiment of the present invention, the brake pressure is produced by increasing the brake pressure in the entire brake circuit until the locking limit of at least one wheel of the axle which locks first is reached. The brake pressure at the axles which have not yet locked is then increased by feeding brake pressure medium into the corresponding brake cylinders from a pressure source. At driven axles it is advantageously possible to make use of the devices for traction control.

The method according to the present invention can, of course be employed on vehicles with any number of vehicle axles. It is also possible in this context to group axles bearing essentially the same load such as tandem or twin axles. These axles then have a common pressure source, by way of which the same common brake pressure is produced in the brake cylinders of the wheels. A common pressure source can supply a number of axles with braking medium if at least one control valve is used to regulate the brake pressure for each axle.

BRIEF DESCRIPTION OF THE VEHICLE

These and further objects, features and advantages of the present invention will become more apparent from the following detailed description thereof when taken in conjunction with the accompanying drawings wherein:

FIG. 1 is a flow diagram of a method according to the present invention for carrying out automatic braking; and FIG. 2 is a schematic diagram of an arrangement for carrying out the method according to the present invention diagrammed in FIG. 1.

DETAILED DESCRIPTION OF THE DRAWINGS

Figure 1:
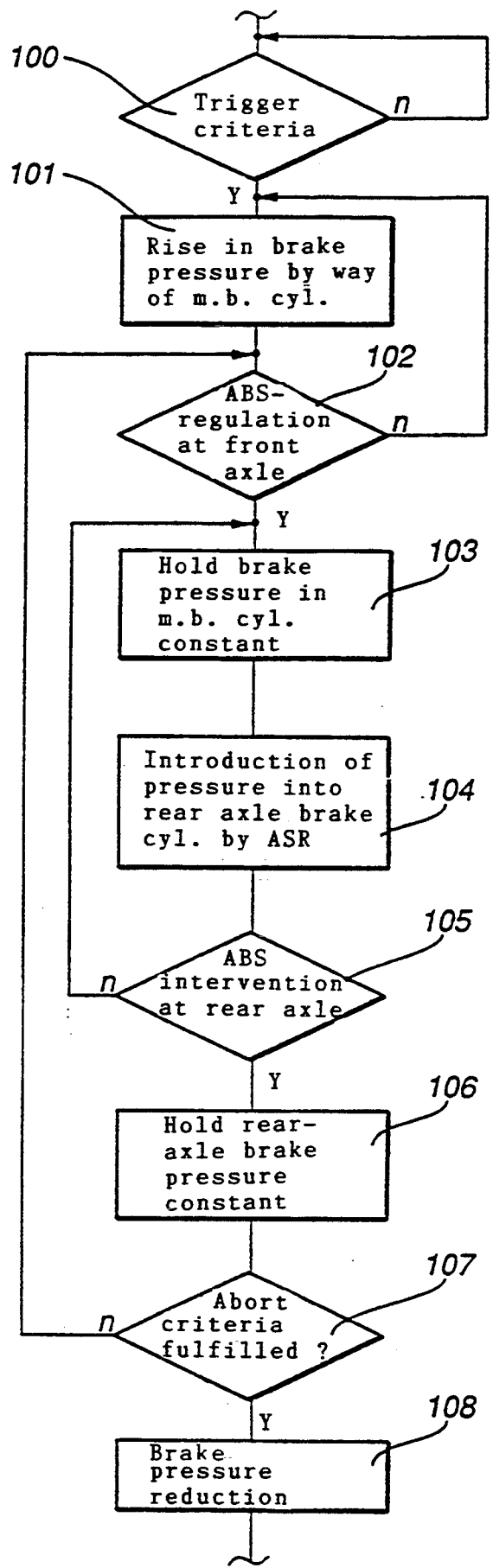

FIG. 1 explains a method for carrying out an automatic braking procedure with reference to a two-axle passenger vehicle, in which the brake system is configured such that, by structural measures such as braking-force distribution, the wheels of the front axle VA lock up first. The rear axle HA is driven. A traction control system ASR for the rear axle HA is installed in the vehicle.

In step 100, a check is made to determine whether the trigger criterion for the automatic braking procedure has been met. If this trigger criterion has been met, the pressure in the master brake cylinder HBZ is increased in accordance with step 101. In step 102, a check is made to determine whether or not the ABS is exercising control at the front axle VA, the axle which locks up first. If no anti-lock control is being performed at the front axle VA, i.e. locking up of at least one wheel is not present, the system jumps back to step 101 and the brake pressure is increased further. As soon as an ABS control intervention is detected in step 102, the brake pressure in the master brake cylinder is held constant in accordance with step 103.

The pressure in the master brake cylinder can be generated by supplying air to the pedal-side chamber of a vacuum brake booster. If a pressure in the master brake cylinder is to be held constant, the pressure in the pedal-side chamber of the brake booster can be regulated by the admission and release of air. Pressure fluctuations produced by pedal travels can also be compensated. Pressure regulation in the pedal-side chamber of the vacuum brake booster can be performed, for example, by a solenoid valve arranged in the control housing of the brake booster.

In step 104, the brake pressure in the brake cylinders of the wheels of the rear axle HA is increased by introducing into the brake cylinders additional braking medium from the pressure source of the traction control system ASR. The supply of braking medium (which is usually brake fluid in the case of passenger vehicles) continues until the system ascertains in step 105 that a control intervention of the ABS is taking place at the rear axle HA. In accordance with step 106, the maximum brake pressure achieved before the control intervention of the anti-lock system at the rear axle is maintained.

In step 107, a check is then made to determine whether an abort criterion is met. If this is the case, then, in accordance with step 108, the brake pressure produced is reduced to the brake pressure level corresponding to the position of the brake pedal. A method for a corresponding brake pressure reduction can be taken, for example, from German Patent Application DE-P. 43 38 067.0, which is not a prior publication.

If it is ascertained in step 107 that the corresponding abort criteria have not been met, the system jumps back to step 102, thereby checking whether the brake pressure produced still corresponds to the locking limit.

Figure 2:
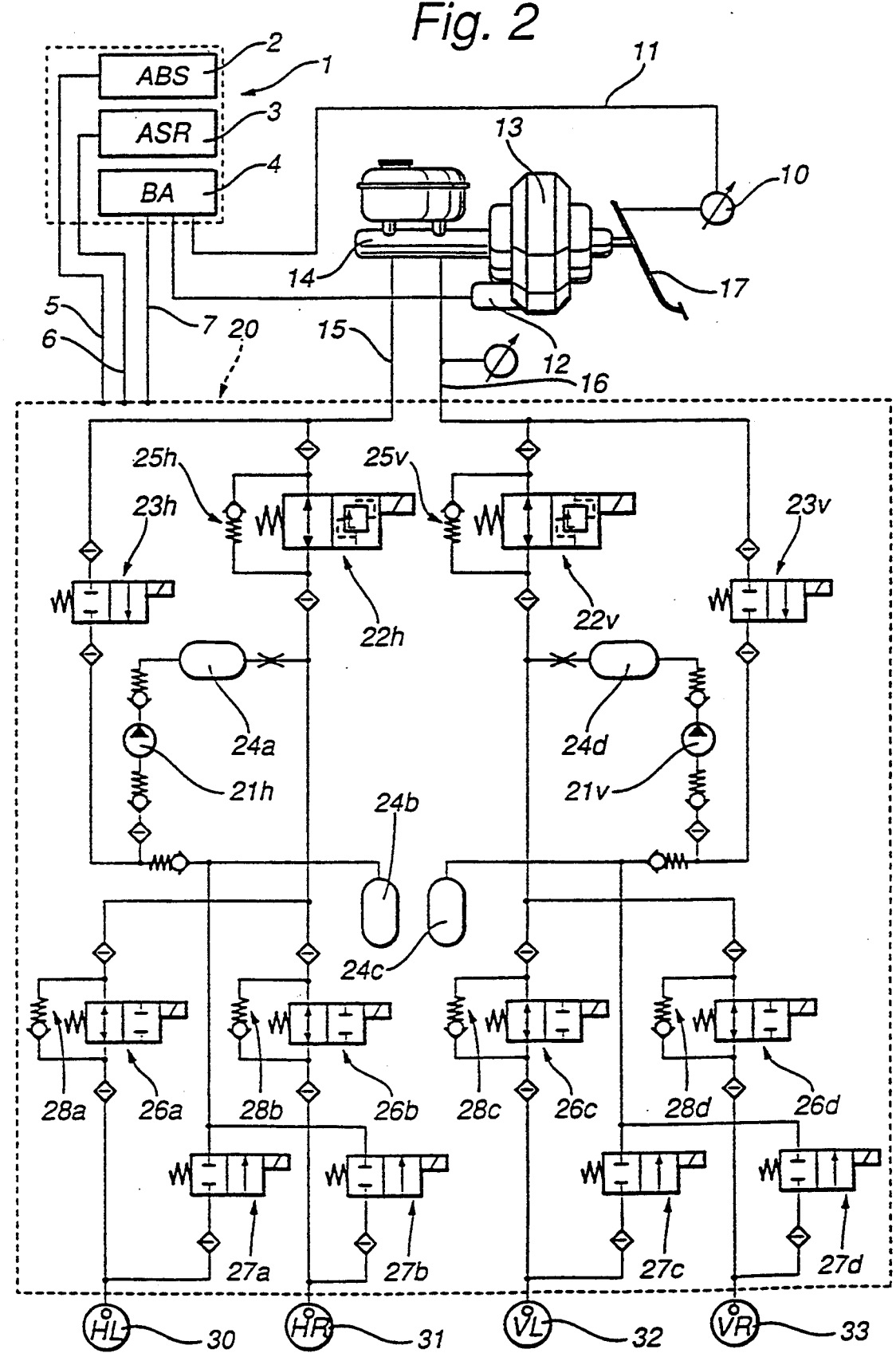

FIG. 2 shown one arrangement for carrying out the method on a two-axle vehicle which has both an ABS and a traction control system ASR. Grouped together in the brake control unit 1 are the control units 2, 3, 4 of the ABS, the traction control system ASR and the automatic braking procedure BA. The conventional leads to the sensors and other control units have not been shown for the sake of clarity, except for lead 11 which transmits the signal of the pedal travel sensor 10 to the control unit 4 for the automatic braking procedure BA. The automatic braking procedure can be triggered as a function of the signal produced by this sensor 10. The braking procedure can then be performed, for example, in accordance with the aforementioned Patent Application DE-P 43 25 940.5.

The brake pressure control leads 5, 6, 7 from the respective control units 2, 3 and 4 leave the brake control unit 1 and lead to the brake pressure control system designated generally by the numeral 20. In the brake pressure control system 20, the brake pressure produced at the brakes 30, 31, 32 and 33 is regulated by valves.

A control lead 8 leads from the control unit 4 for the automatic braking procedure to the solenoid valve 12 arranged on the vacuum brake booster 13. Via the solenoid valve 12, air can be admitted to the pedal-side chamber of the vacuum brake booster and a brake pressure can thereby be produced in the master brake cylinder 14 higher than that which corresponds to the position of the brake pedal 17 prior to the beginning of the automatic braking procedure. From the master brake cylinder 14, the brake lines 15, 16 lead to the brakes 30, 31 of the rear axle HA and to the brakes 32, 33 of the front axle. In the normal operating condition, i.e. when the brake control unit 1 is not performing any regulation of the brakes 30, 31, 32, 33, the valves of the brake-pressure control system are switched so that the brake pressures produced in the master brake cylinder 14 are introduced directly, via the brake lines 15, 16, into the wheel brake cylinders of the brakes 30, 31, 32, 33.

The brake pressure control system 20 controls the brake pressure when regulation by the brake control unit 1 starts. For this purpose, there is a return pump $21v$, $21h$ for each of the two brake circuits, one of which supplies the front axle VA and the other supplies the rear axle HA. The two return pumps $21v$, $21h$ can have a common drive. The return pumps $21v$, $21h$ serve to reduce an excessive brake pressure in the wheel brake cylinder during regulation by the control unit 2 of the ABS by pumping off brake fluid.

In the case of regulation of the brake pressure by the control unit 3 of the traction control system ASR, the return pumps $21v$, $21h$ serve to produce an increased brake pressure in individual brakes 30, 31, 32, 33 by feeding in additional brake fluid. For this purpose, the reversing valve $22v$, $22h$, of which there is one for each brake circuit, is actuated. The reversing valve $22v$ or $22h$ shuts off the master brake cylinder 14 from higher pressures at the brakes 23, 33 or 30, 31. At the same time, the precharging valve $23v$ or $23h$, which shuts off in the rest position, is operated. A brake pressure produced in the master brake cylinder 14 which exceeds the brake pressure produced by the traction control system is then fed to the brakes via the non-return valve $25v$ or $25h$. The accumulators $24a$, $24b$, $24c$, $24d$ serve as compensating reservoirs for absorption of pressure surges in the brake circuit as occur, for example, when the valves are operated or when a return pump $21v$, $21h$ is switched over from anti-lock regulation to traction control or vice versa.

Arranged upstream of each brake 30, 31, 32, 33 there is furthermore an inlet valve $26a$, $26b$, $26c$, $26d$ with a non-return valve $28a$, $28b$, $28c$, $28d$ arranged in parallel therewith it and an outlet valve $27a$, $27b$, $27c$, $27d$. In the rest position, the inlet valves $26a$, $26b$, $26c$, $26d$ are open but close when regulation by the control unit 2 of the traction control system begins and a further increase in brake pressure at the corresponding wheel ought to be prevented. As the introduced brake pressure falls, the return of brake fluid to the master brake cylinder 14 is assured by the non-return valve $28a$, $28b$, $28c$, $28d$.

The selective reduction of the brake pressure at one brake 30, 31, 32, 33 is performed by opening the corresponding outlet valve $27a$, $27b$, $27c$, $27d$ which is shut off at rest. A brake pressure at one brake 30, 31, 32, 33 can be held constant by switching the associated inlet valve $26a$, $26b$, $26c$, $26d$ and the associated outlet valve $27a$, $27b$, $27c$, $27d$ and the associated reversing valve $22v$, $22h$ to the shut-off position.

By the nature of the system, the brake pressure at each axle is, of course, limited at any time by the maximum brake pressure which can be produced at the respective axle. During the automatic braking procedure, the procedure followed for each axle is such that if, when the maximum brake pressure that can be produced at this axle is introduced, the locking limit for at least one wheel of this axle is not achieved, the maximum brake pressure that can be produced at this axle is fed in until either the automatic braking procedure is ended or at least one wheel of the axle reaches the locking limit. This takes place independently of any other increases in brake pressure to be performed at other axles. In the illustrative embodiment in accordance with FIG. 1, this is achieved as follows. If, in the enquiry of step 102, it is ascertained that regulation of the front axle is not taking place, a check is made in a further enquiry as to whether the maximum brake pressure that can be produced by the master brake cylinder is being produced. If this is the case, the system jumps to step 103. Otherwise, the system jumps to step 102.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for automatic braking of a motor vehicle with an anti-lock system, comprising the steps of carrying out an automatic braking procedure on fulfillment of a trigger criterion, producing a higher pressure than that which corresponds to the position of a brake pedal during the automatic braking procedure individually at each axle of the vehicle until at least one wheel of each axle reaches an associated locking limit detected by the anti-lock system, and ending the automatic braking procedure in which higher pressure is produced at individual axles on fulfillment of an abort criterion wherein brake pressure increase is effected via a master brake cylinder until the locking limit of an axle which locks up first is reached and, for further increase of the brake pressure at least at one other axle, there is at least one pressure source for the braking medium of the vehicle, with the brake pressure produced at the at least one other axle being regulated by at least one control valve.

2. The method according to claim 1, wherein a pressure source is provided for each axle.

3. The method according to claim 1, wherein the pressure source constitutes at least one pressure source as a traction control system pressure source.

4. The method according to claim 2, wherein the pressure source and at least one control valve for driven axles of the motor vehicle are constituted by a pressure source and control valves of a traction control system associated with the axles.

5. The method according to claim 1, wherein the brake pressure for each axle is limited at all times by a maximum brake pressure producible at each axle.

6. A method for automatic braking of a motor vehicle with an anti-lock system, comprising the steps of
determining that a trigger criterion has been met;
producing a higher brake pressure at each axle of the motor vehicle than pressure which corresponds to a brake pedal position such that at least one wheel of at least one axle reaches a locking limit;
detecting the reaching of the locking limit of individual wheels of the motor vehicle; and
ending automatic braking upon fulfillment of an abort criterion, wherein brake pressure increase is effected via a master brake cylinder until the locking limit of an axle which locks up first is reached and, for further increase of the brake pressure at least at one other axle, there is at least one pressure source for the braking medium of the vehicle, with the brake pressure produced at the at least one other axle being regulated by at least one control valve.

7. An apparatus for automatic braking of a motor vehicle with an anti-lock system, comprising
means of determining that a trigger criterion has been met;
means for producing a higher brake pressure at each axle of the motor vehicle than pressure which corresponds to a brake pedal position such that at least one wheel of at least one axle reaches a locking limit, wherein brake pressure increase is effected via a master brake cylinder until the locking limit of an axle which locks up first is reached and, for further increase of the brake pressure at least at one other axle, there is at least one pressure source for the braking medium of the vehicle, with the brake pressure produced at the at least one other axle being regulated by at least one control valve;
means for detecting the reaching of the locking limit of individual wheels of the motor vehicle; and
means for ending automatic braking upon fulfillment of an abort criterion.

8. The apparatus according to claim 7, wherein a pressure source is provided for each axle.

9. The apparatus according to claim 7, wherein the pressure source constitutes at least one pressure source as a traction control system pressure source.

10. The apparatus according to claim 9, wherein the pressure source and at least one control valve for driven axles of the motor vehicle are constituted by a pressure source and control valves of a traction control system associated with the axles.

11. The apparatus according to claim 7, wherein the producing means includes means for limiting brake pressure for each axle at all times by a maximum brake pressure producible at each axle.

* * * * *